United States Patent
Wang et al.

(10) Patent No.: US 10,598,796 B1
(45) Date of Patent: Mar. 24, 2020

(54) METHOD AND APPARATUS FOR POSITIONING

(71) Applicant: Marvell International Ltd., Hamilton (BM)

(72) Inventors: Yongsong Wang, Shanghai (CN); Zhike Jia, Fremont, CA (US); Juhong Xing, Shanghai (CN); PeiYang Zhang, Shanghai (CN); Mobo Qiu, Shanghai (CN); Kun Xu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 299 days.

(21) Appl. No.: 15/362,573

(22) Filed: Nov. 28, 2016

Related U.S. Application Data (60) Provisional application No. 62/261,575, filed on Dec. 1, 2015.

(51) Int. Cl.
*G01S 19/24* (2010.01)
*G01S 19/25* (2010.01)

(52) U.S. Cl.
CPC .......... *G01S 19/243* (2013.01); *G01S 19/246* (2013.01); *G01S 19/25* (2013.01); *G01S 19/258* (2013.01)

(58) Field of Classification Search
CPC ...... G01S 19/243; G01S 19/258; G01S 19/27; G01S 19/05; G01S 19/25
See application file for complete search history.

(56) References Cited

U.S. PATENT DOCUMENTS

| | | | | |
|---|---|---|---|---|
| 6,252,545 | B1 * | 6/2001 | Da | G01S 19/05 342/357.42 |
| 8,301,375 | B2 * | 10/2012 | Chiayee | G01S 19/37 342/357.22 |
| 8,730,101 | B2 * | 5/2014 | Shah | G01S 19/235 342/357.64 |
| 9,465,114 | B2 | 10/2016 | Syrjärinne et al. | |
| 2007/0159387 | A1 * | 7/2007 | Syrjarinne | G01S 19/05 342/357.63 |

(Continued)

FOREIGN PATENT DOCUMENTS

| CN | 101558323 A | 10/2009 |
|---|---|---|
| CN | 101576614 A | 11/2009 |
| CN | 102209911 A | 10/2011 |

OTHER PUBLICATIONS

Trimble. "Trimble OEM BD9xx GNSS Receiver Family." version 4.80. Revision A. May 2013. 15 pages printed. (Year: 2013).*

(Continued)

*Primary Examiner* — Gregory C. Issing (57) ABSTRACT

Aspects of the disclosure provide an apparatus that includes a receiving circuit and a processing circuit. The receiving circuit is configured to receive a satellite signal transmitted from a satellite. The satellite signal carries navigation bits that are transmitted with a navigation bit length. The processing circuit is configured to construct aiding navigation bits based on aiding ephemeris and almanac information that are provided by an aiding source other than the satellite signal. Further, the processing circuit is configured to strip the navigation bits from the satellite signal based on the aiding navigation bits to generate a post-stripping signal, and perform an integration on the post-stripping signal.

18 Claims, 4 Drawing Sheets

(56) References Cited

U.S. PATENT DOCUMENTS

| | | | |
|---|---|---|---|
| 2008/0125971 A1* | 5/2008 | van Diggelen | G01S 19/05 |
| | | | 701/530 |
| 2008/0228398 A1 | 9/2008 | Syrjarinne et al. | |
| 2014/0062770 A1* | 3/2014 | Gao | G01S 19/34 |
| | | | 342/357.25 |
| 2015/0362597 A1 | 12/2015 | Syrjarinne et al. | |

OTHER PUBLICATIONS

Novatel. "OEMStar: Frmware Reference Manual." Revision 6. Feb. 2014. pp. 1-387. (Year: 2014).*

Thales Navigation."GG12-Pro OEM Board Reference Manual." Copyright 2000. pp. 1-308 (Year: 2000).*

CN Application No. 201510939094.3, Office Action, dated Sep. 12, 2019, 10 pages.

CN Application No. 201510939094.3, Office Action, dated Apr. 2, 2019, 11 pages.

U.S. Appl. No. 14/962,670, Notice of Allowance, dated Sep. 19, 2017, 9 pages.

U.S. Appl. No. 201510939094.3, Non-Final office action, dated Mar. 22, 2017, 12 pages.

* cited by examiner

METHOD AND APPARATUS FOR POSITIONING

INCORPORATION BY REFERENCE

This present disclosure claims the benefit of U.S. Provisional Application No. 62/261,575, "Method and Apparatus for Performing Bit Strip in GNSS Receiver with Reference to Auxiliary Information" filed on Dec. 1, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A satellite based positioning device receives satellite signals from at least four satellites. The satellite signals carry information for satellite based positioning, such as ranging codes that are pseudo random noise (PRN) codes and are used to measure distance to the satellites, navigation messages that can be used to calculate position of the satellites in orbit, information of time and status of the satellites, and the like. Generally, the satellite based positioning device extracts the information for satellite based positioning, and determines a position of the satellite based positioning device based on the information.

SUMMARY

Aspects of the disclosure provide an apparatus that includes a receiving circuit and a processing circuit. The receiving circuit is configured to receive a satellite signal transmitted from a satellite. The satellite signal carries navigation bits that are transmitted with a navigation bit length. The processing circuit is configured to construct aiding navigation bits based on aiding ephemeris and almanac information that is provided by an aiding source other than the satellite signal. Further, the processing circuit is configured to strip the navigation bits from the satellite signal based on the aiding navigation bits to generate a post-stripping signal, and perform an integration on the post-stripping signal.

In an embodiment, the processing circuit is configured to perform the integration on the post-stripping signal with an integration length that is longer than the navigation bit length. In an example, the processing circuit is configured to perform a coherent integration on the post-stripping signal. Further, in an example, the processing circuit is configured to measure Doppler frequency based on the integration.

In an embodiment, the apparatus includes a communication interface circuit configured to receive the aiding ephemeris and almanac information from an external source. In another embodiment, the apparatus includes a memory circuit configured to store the aiding ephemeris and almanac information. In another embodiment, the processing circuit is configured to predict the aiding ephemeris and almanac information.

According to an aspect of the disclosure, the apparatus includes an update controller configured to determine whether the aiding ephemeris and almanac information expires, and request an update of the aiding ephemeris and almanac information from the aiding source when the aiding ephemeris and almanac information expires. In an example, the update controller is configured to disable the processing circuit from stripping the navigation bits from the satellite signal when the aiding ephemeris and almanac information expires.

Aspects of the disclosure provide a method for determining a position of a device. The method includes receiving, by the device, a satellite signal transmitted from a satellite. The satellite signal carries navigation bits that are transmitted with a navigation bit length. Then, the method includes constructing aiding navigation bits based on aiding ephemeris and almanac information that is provided by an aiding source other than the satellite signal, stripping the navigation bits from the satellite signal based on the aiding navigation bits to generate a post-stripping signal, and performing an integration on the post-stripping signal.

Aspects of the disclosure provide a non-transitory computer readable medium storing program instructions for causing a processor to execute operations for positioning. The operations comprise receiving, correlations between a satellite signal and an internal code. The satellite signal carries navigation bits that are transmitted with a navigation bit length. Further, the operations comprise constructing aiding navigation bits based on aiding ephemeris and almanac information that is provided by an aiding source other than the satellite signal, stripping the navigation bits from the satellite signal based on the aiding navigation bits to generate a post-stripping signal, and performing an integration on the post-stripping signal.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
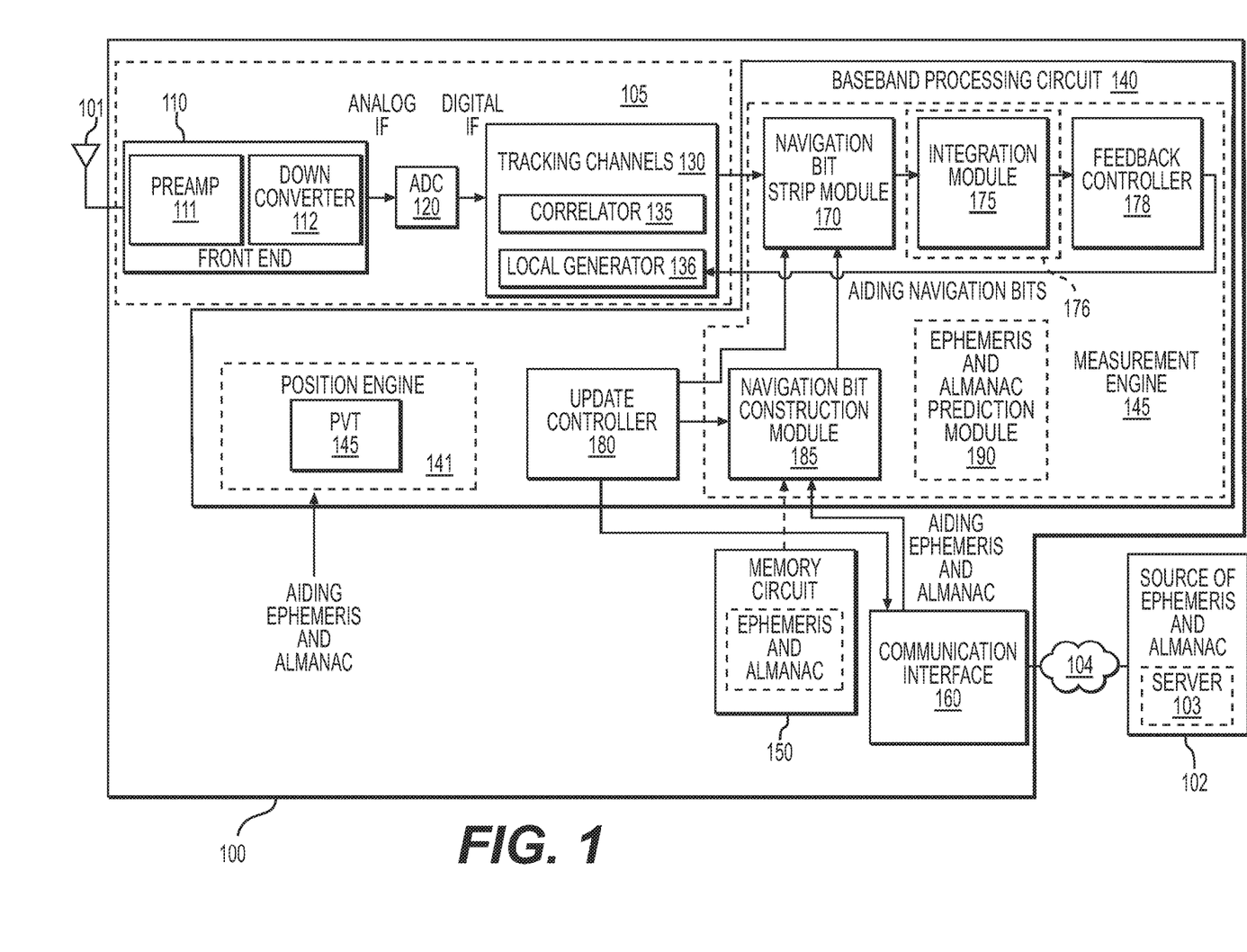
FIG. 1 shows a block diagram of an electronic device 100 according to an embodiment of the disclosure.

FIG. 1 shows a block diagram of an electronic device 100 according to an embodiment of the disclosure. The electronic device 100 is configured to receive satellite signals that carry navigation bits that are transmitted with a navigation bit length. Further, the electronic device 100 is configured to construct aiding navigation bits based on aiding ephemeris and almanac information that is provided by an aiding source other than the satellite signals. Then, the electronic device 100 is configured to strip the navigation bits from satellite signals based on the aiding navigation bits to generate a post-stripping signal, and to perform an integration, for example coherent integration, on the post-stripping signal in a measurement of the satellite signals. In an embodiment, the electronic device 100 is configured to perform the integration on the post-stripping signal with an integration length longer than the navigation bit length to achieve higher resolution in the measurement.

The electronic device 100 can be any suitable device, such as a tablet computer, a smart phone, a camera, a wearable device, a handheld global positioning system (GPS) device, a vehicle mountable GPS device, and the like. The electronic device 100 includes a satellite signal receiver 105 configured to receive satellite signals transmitted by a satellite system, such as the Global Positioning System (GPS), the GLObal-naja NAvigatsionnaja Sputnikovaja Sistema (GLONASS) satellite system, the Galileo navigation satellite system, the Beidou navigation satellite system, and the like. Based on the satellite signals, the electronic device 100 determines a position of the electronic device 100.

Specifically, in the FIG. 1 example, the satellite signal receiver 105 includes receiving circuits, such as a front end processing circuit 110, an analog to digital converter (ADC) 120, a plurality of tracking channels 130 and the like. The electronic device 100 further includes a baseband processing circuit 140 coupled with the satellite signal receiver 105 as shown in FIG. 1.

The front end processing circuit 110 is coupled to an antenna 101. The antenna 101 is configured to receive satellite signals. In an example, satellites respectively broadcast radio frequency signals (satellite signals) to carry information for satellite based positioning, such as ranging codes that are pseudo random noise (PRN) codes and are used to measure distance to the satellites, navigation messages (e.g., formed of navigation bits) that can be used to calculate position of the satellites in orbit, information of time and status of the satellites, and the like. The antenna 101 is configured to generate electrical signals in response to the radio frequency signals in the air. It is noted that the radio frequency signals received by the antenna 101 can include direct line of sight radio frequency signals from the satellites and reflections of the radio frequency signals due to, for example buildings, and the like.

The front end processing circuit 110 includes various analog circuits, such as amplifier, filter, down-converter, and the like, to process the electrical signals. In the FIG. 1 example, the front end processing circuit 110 includes a pre-amplifier 111 to amplify the electrical signals to an appropriate level and includes a down-converter 112 to down-convert a radio frequency signal to an analog intermediate frequency (IF) signal, for example. The ADC 120 is configured to sample the analog IF signal, and convert the sampled analog IF signal to a digital IF signal.

The tracking channels 130 are configured to receive the digital IF signals, and demodulate the digital IF signals. In an embodiment, the satellite signal receiver 105 includes four or more tracking channels 130 respectively corresponding to four or more satellites.

According to an aspect of the disclosure, a tracking channel 130 includes a plurality of correlator circuits 135. Each of the correlator circuits is configured to calculate correlations between a first data series corresponding to a received satellite signal and a second data series that is generated locally. In an embodiment, the tracking channel 130 includes a local generator circuit 136 configured to generate the second data series. The local generator circuit 136 is controlled to adjust the generation of the second data series for varies purpose, such as for searching the Doppler frequency, for searching PRN code, and the like.

It is noted that the tracking channels 130 also include other suitable circuit, such as mixer circuits for down-conversion to baseband, and the like.

The baseband processing circuit 140 is configured to receive correlation outputs from the tracking channels 130, and perform baseband operations. The baseband processing circuit 140 can be implemented using various techniques. In an embodiment, the baseband processing circuit 140 is implemented using circuits to perform the operations. In another embodiment, the baseband processing circuit 140 is implemented as a processor executing software instructions to perform the operations.

According to an aspect of the disclosure, the baseband processing circuit 140 includes a position engine 141, a measurement engine 145 and an update controller 180. The position engine 141, the measurement engine 145 and the update controller 180 can be respectively implemented using solely circuits or implemented as a processor executing software instructions.

The measurement engine 145 is coupled with the receiver circuit 105 to perform measurements on the received satellite signals, such as a Doppler frequency measurement, a pseudo range measurement, a carrier to noise power ratio measurement and the like. In some embodiments, a measurement accuracy of the measurement engine 145 depends on an integration length. However, when signals for integration still carry navigation bits, the integration length is limited to a maximum of a navigation bit length, and when navigation bits are stripped from the signals, the integration length can be increased over the navigation bit length to improve measurement accuracy.

The position engine 141 is configured to perform operations for position calculation. In an example, the position engine 141 is configured to determine position, velocity and time (PVT) of satellites. Further, the position engine 141 receives the measurements from the measurement engine 145 and determines position, velocity and time (PVT) of the electronic device 100. For example, the position engine 141 determines a position fix using a least-square filter or a Kalman filter.

Generally, the position engine 141 requires ephemeris and almanac to calculate the position, velocity and time of the satellites. The ephemeris and the almanac are carried by the satellite signals in navigation messages. In an example, a navigation message is formed of a stream of navigation bits that are transmitted at 50 bits per second, thus each navigation bit is transmitted over a navigation bit length of 20 ms. The ephemeris and the almanac generally include a relatively large amount of data. For example, it takes more than 12 minutes to transmit navigation bits for the whole almanac. The navigation bits can be decoded from the satellite signals by the baseband processing circuit 140. When the satellite signals are weak for example at urban down area, it is hard for the baseband processing circuit 140 to correctly decode the navigation bits. Even when the signal power is strong enough to decode the navigation bits, it takes a relatively long time, such as more than 12 minutes to receive the whole almanac.

According to an aspect of the disclosure, the baseband processing circuit 140 receives ephemeris and almanac from an aiding source other than the satellite signals. The ephemeris and almanac provided by the aiding source is used by the position engine 141 to calculate the PVT of the satellites, and is used by the measurement engine 145 to strip the navigation bits. The ephemeris and almanac provided by the aiding source is referred to as aiding ephemeris and almanac.

In some embodiments, the electronic device 100 includes a memory circuit 150 configured to store the aiding ephemeris and almanac, and provide the aiding ephemeris and almanac to the position engine 141 and the measurement engine 145. In some embodiments, the baseband processing circuit 140 includes an ephemeris and almanac prediction module 190 configured to predict the aiding ephemeris and almanac and provide the predicted aiding ephemeris and almanac to the position engine 141 and the measurement engine 145.

In some embodiments, the electronic device 100 requests an external source 102 to provide the aiding ephemeris and almanac. In the FIG. 1 example, the external source 102 includes a server 103 configured to provide the aiding ephemeris and almanac in response to requests. In the example, the electronic device 100 includes a communication interface circuit 160 configured to enable communication with the external source 102. In an embodiment, the communication interface circuit 160 is wireless communication interface, and is configured to use wireless communication technology to communicate with the server 103 via a network 104. In another embodiment, the communication interface circuit 160 is a wired communication interface, and is configured to use wired communication technology to communicate with the server 103 via the network 104.

The network 104 can be wired, wireless, a local area network (LAN), a wireless LAN (WLAN), a fiber optical network, a wide area network (WAN), a peer-to-peer network, the Internet, etc. or any combination of these that interconnects the electronic device 100 and the server 103.

According to an aspect of the disclosure, the measurement engine 145 is configured to determine aiding navigation bits from the aiding ephemeris and almanac provided by the aiding source other than the satellite signals. Then the measurement engine 145 strips the navigation bits from the correlation outputs based on the aiding navigation bits.

Specifically, in the FIG. 1 example, the measurement engine 145 includes a navigation bit construction module 185, a navigation bit strip module 170, an integration module 175, and a feedback controller 178 coupled together as shown in FIG. 1. The components of the measurement engine 145 can be implemented using solely circuits or can be implemented as a processor executing software instructions.

The navigation bit construction module 185 is configured to construct the aiding navigation bits according to a navigation message specification based on the aiding ephemeris and almanac that is provided from the aiding source other than the satellite signals.

In an example, the navigation bit construction module 185 is configured to convert data format according to a navigation message specification. In an example, the aiding ephemeris and the almanac is provided using float format or double format. The navigation bit construction module 185 is configured to convert the float format or the double format to raw binary bits, and convert the raw binary bits to navigation bits according to a navigation message specification.

For example, both of the float format and the double format include a sign portion (Sign), an exponent portion (Exp) and a fraction portion (Frac). The float format includes a binary bit for the sign portion, 8 binary bits for the exponent portion, and 23 binary bits for the fraction portion. The double format includes a binary bit for the sign portion, 11 binary bits for the exponent portion, and 52 binary bits for the fraction portion. Then, the raw binary bits (Raw) can be constructed using Eq. 1:

$$Raw = Sign \times (1 + 0 \cdot Frac) \times 2^{Exp} \qquad \text{Eq. 1}$$

Then, navigation bit construction module 185 converts the raw binary bits to binary bits for navigation message according to the navigation message specification. Further, the navigation bit construction module 185 constructs parity bits based on the binary bits for navigation message. The navigation bits construction module 185 suitably combines the binary bits for navigation message and the parity bits to form the aiding navigation bits.

The navigation bit strip module 170 receives the aiding navigation bits from the navigation bits construction module 185, and strips the navigation bits from the correlation outputs based on the aiding navigation bits. In an example, the navigation bit strip module 170 identifies a leading edge and a trailing edge of a navigation bit in the correlation outputs, determines the navigation bit based on the aiding navigation bits, adjusts the correlation outputs between the two edges to offset the influence caused by the navigation bit to strip the navigation bit, generates post-stripping signals, and provide the post-stripping signals to the integration module 175.

The integration module 175 is configured to perform coherent integration and non-coherent integration. In an embodiment, the integration module 175 is configured to receive post-stripping signals, and perform coherent integration with an integration length (T) that is equal to 20×N milliseconds, N is a positive integer. In an example, the integration module 175 is a part of a discrete Fourier transform (DFT) module 176. The DFT module 176 is configured to perform DFT calculations, and to determine Doppler frequency based on the DFT calculations. In an example, a DFT calculation use coherent integration operations as shown in Eq. 2 (assuming sampling rate is 1 per millisecond):

$$X_{coh} = \left| \sum_{n=0}^{N-1} \left( b_n \times \sum_{i=1}^{19} x_{i+20 \times n} \right) \right| \qquad \text{Eq. 2}$$

The coherent integration operations have less leakage than non-coherent integration operations as shown in Eq. 3:

$$X_{non-coh} = \sum_{n=0}^{N-1} \left| \sum_{i=1}^{19} x_{i+20 \times n} \right| \qquad \text{Eq. 3}$$

Figure 4:
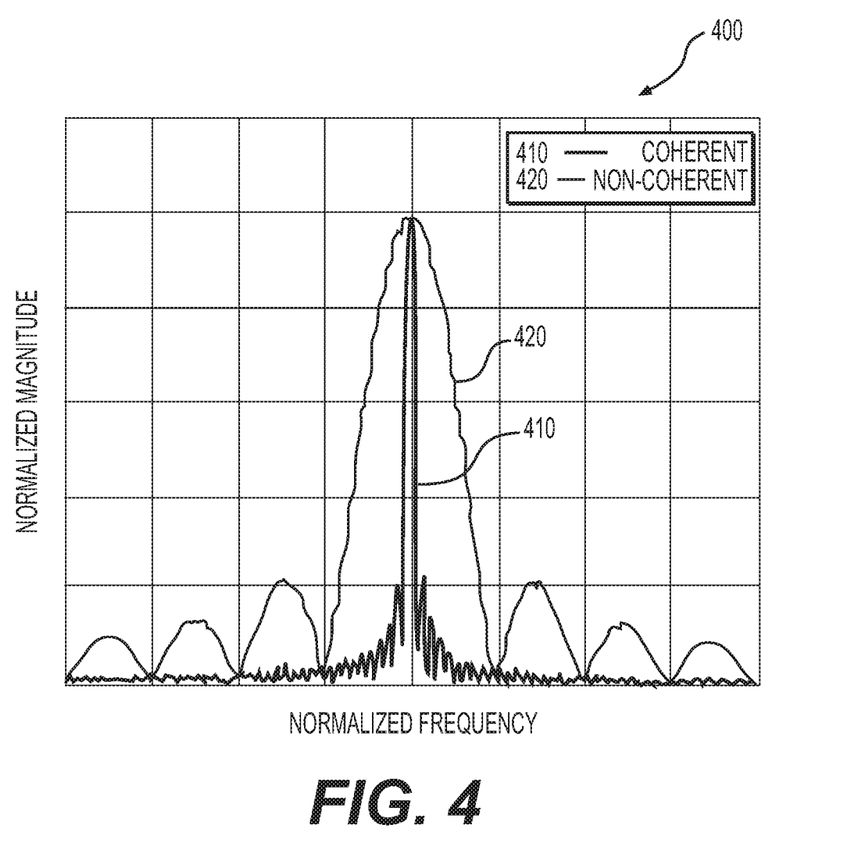
FIG. 4 shows a comparison plot for coherent and non-coherent integration according to an embodiment of the disclosure.

A comparison of coherent integration and non-coherent integration is shown in FIG. 4. FIG. 4 shows a plot 400 to compare coherent integration and non-coherent integration. The X-axis shows normalized frequency, and the Y-axis shows normalized power distribution according to DFT calculation. The plot 400 includes a first curve 410 that uses coherent integration in DFT calculation, and a second curve 420 that uses non-coherent integration. The measurement of Doppler frequency corresponding to the power peak has a higher resolution for the first curve 410 than the second curve 420. The coherent integration improves frequency resolution.

The frequency resolution ($f_r$) of the DFT calculation depends on the integration length (T) of the coherent integration operations as shown in Eq. 4:

$$f_r = 1/T \qquad \text{Eq. 4}$$

The feedback controller 178 is configured to determine feedback control signals based on measurement results to control the tracking channels 130 for example. In an example, the feedback controller 178 determines frequency adjustment, phase adjustment and the like to control the local generator 136 to generate the second data series.

Further according to an aspect of the disclosure, the update controller 180 is configured to control an update of the aiding ephemeris and almanac, and control the operations of the position engine 141 and the measurement engine 145 in response to the update of the aiding ephemeris and the almanac.

In an embodiment, the update controller 180 is configured to determine whether the aiding ephemeris and almanac expires. When the aiding ephemeris and almanac expires, the update controller 180 requests the aiding source to provide new aiding ephemeris and almanac. In addition, the update controller 180 disables the navigation bit strip module 170 from striping the navigation bits. The detail operations of the update controller 180 are described referring to FIG. 3.

It is noted that in an embodiment, the satellite signal receiver 105 and the baseband processing circuit 140 are integrated on an integrated circuit (IC) chip. In another embodiment, the satellite signal receiver 105 and the baseband processing circuit 140 are integrated on different IC chips.

Figure 2:
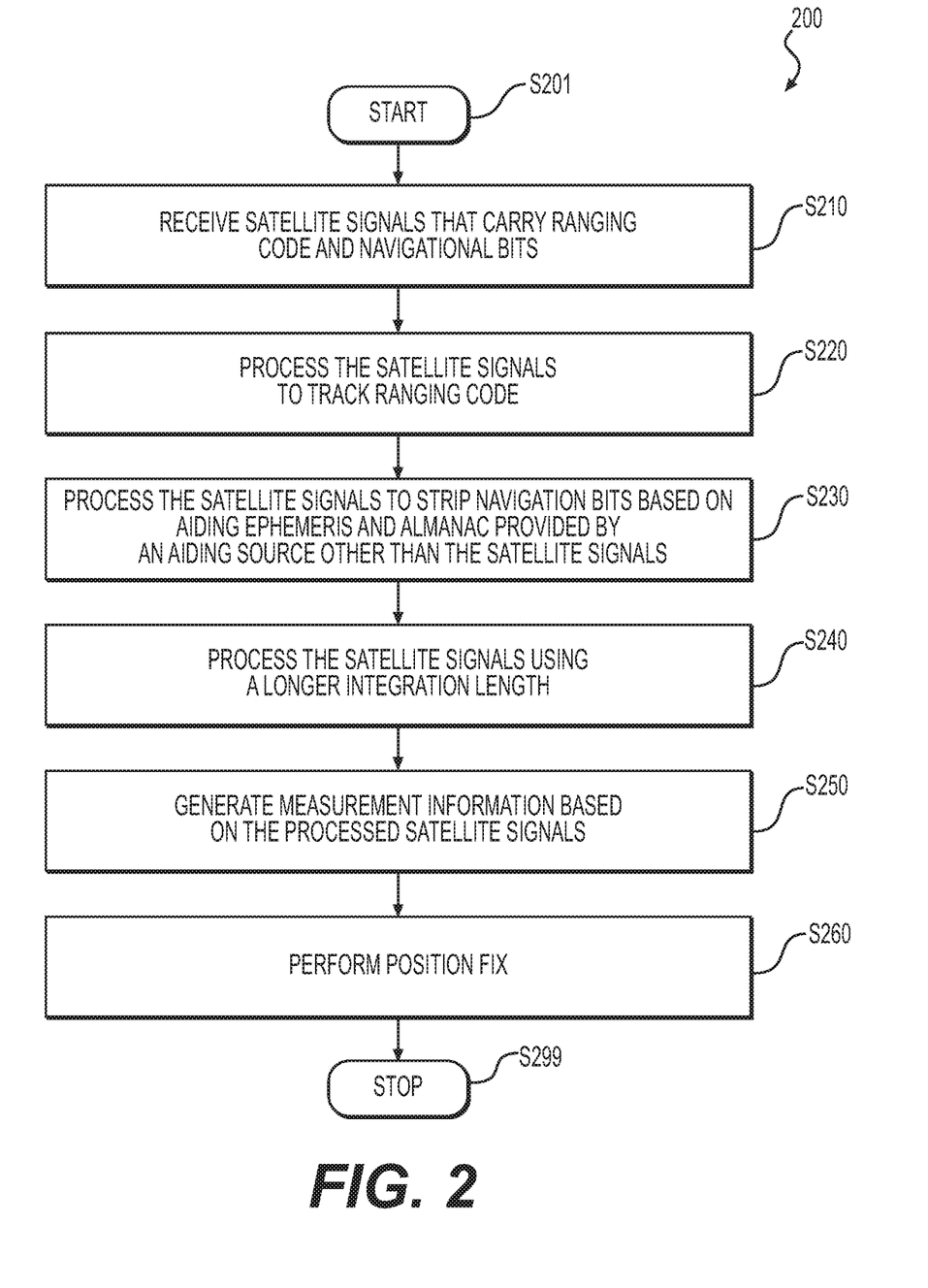
FIG. 2 shows a flow chart outlining a process 200 according to an embodiment of the disclosure.

FIG. 2 shows a flow chart outlining a process 200 according to an embodiment of the disclosure. In an example, the process 200 is executed in the electronic device 100. The process starts at S201 and proceeds to S210.

At S210 satellite signals are received. In the FIG. 1 example, satellites respectively broadcast satellite signals to carry, for example ranging codes (PRN codes), navigation messages and the like. The antenna 101 is configured to generate electrical signals in response to the satellite signals in the air.

At S220, the satellite signals are processed to track ranging codes. In the FIG. 1 example, the pre-amplifier 111 amplifies the electrical signals to an appropriate level and the down-converter 112 down-converts the electrical signals from radio frequency to an analog intermediate frequency (IF) signal, for example. The ADC 120 samples the analog IF signal, and convert the sampled analog IF signal to a digital IF signal. The digital IF signal is further down-converted (e.g., by mixer circuits in the tracking channels 130) to baseband. The correlator circuits 135 calculate correlations between a first data series corresponding to the received satellite signal and a second data series that is generated locally, for example by the local generator 136.

At S230, aiding navigation bits are constructed from an aiding source other than the satellite signals, and navigation bits are stripped from the satellite signals based on the aiding navigation bits. In the FIG. 1 example, the navigation bit construction module 185 receives the aiding ephemeris and almanac from an aiding source other than the satellite signals (e.g., from the server 103, the memory 150, the ephemeris and/or almanac prediction module 190, and the like). The navigation bit construction module 185 converts the aiding ephemeris and almanac from, for example, the float format or the double format to raw binary bits, and then converts the raw binary bits to binary bits for navigation message according to the navigation message specification. Further, the navigation bit construction module 185 constructs parity bits based on the binary bits for navigation message. The navigation bits construction module 185 combines the binary bits for navigation message and the parity bits to form the aiding navigation bits.

The navigation bit strip module 170 receives the aiding navigation bits from the navigation bits construction module 185, and strips the navigation bits from the correlation outputs. In an example, the navigation bit strip module 170 identifies a leading edge and a trailing edge of a navigation bit in the correlation outputs, determines the navigation bit according to the aiding navigation bits, and adjusts the outputs between the two edges to offset the influence caused by the navigation bit in order to strip the navigation bit.

At S240, relatively long integration length is used in the satellite signal processing. In the FIG. 1 example, the DFT module 176 uses coherent integrations, such as shown in Eq. 2, to calculate the frequency response. Because the navigation bits are stripped from the correlation outputs, and post-stripping correlation results are used for coherent integration, a relatively long integration length can be used on the post-stripping correlation results. In an example, the integration length is 20×N milliseconds, where N is a positive integer.

At S250, measurement results are generated based on the processed satellite signals. In an example, the feedback controller 178 determines the Doppler frequency based on the DFT results. Due to the long integration length, the Doppler frequency can be determined with a relatively high resolution.

At S260, the position of the device is determined. In the FIG. 1 example, the position engine 141 determines position, velocity and time (PVT) of satellites. Further, the position engine 141 receives the measurements, such as the Doppler frequency, and the like from the measurement engine 145 and determines the position, velocity and time (PVT) of the electronic device 100. For example, the position engine 141 determines a position fix using a least-square filter or a Kalman filter. Then the process proceeds to S299 and terminates.

Figure 3:
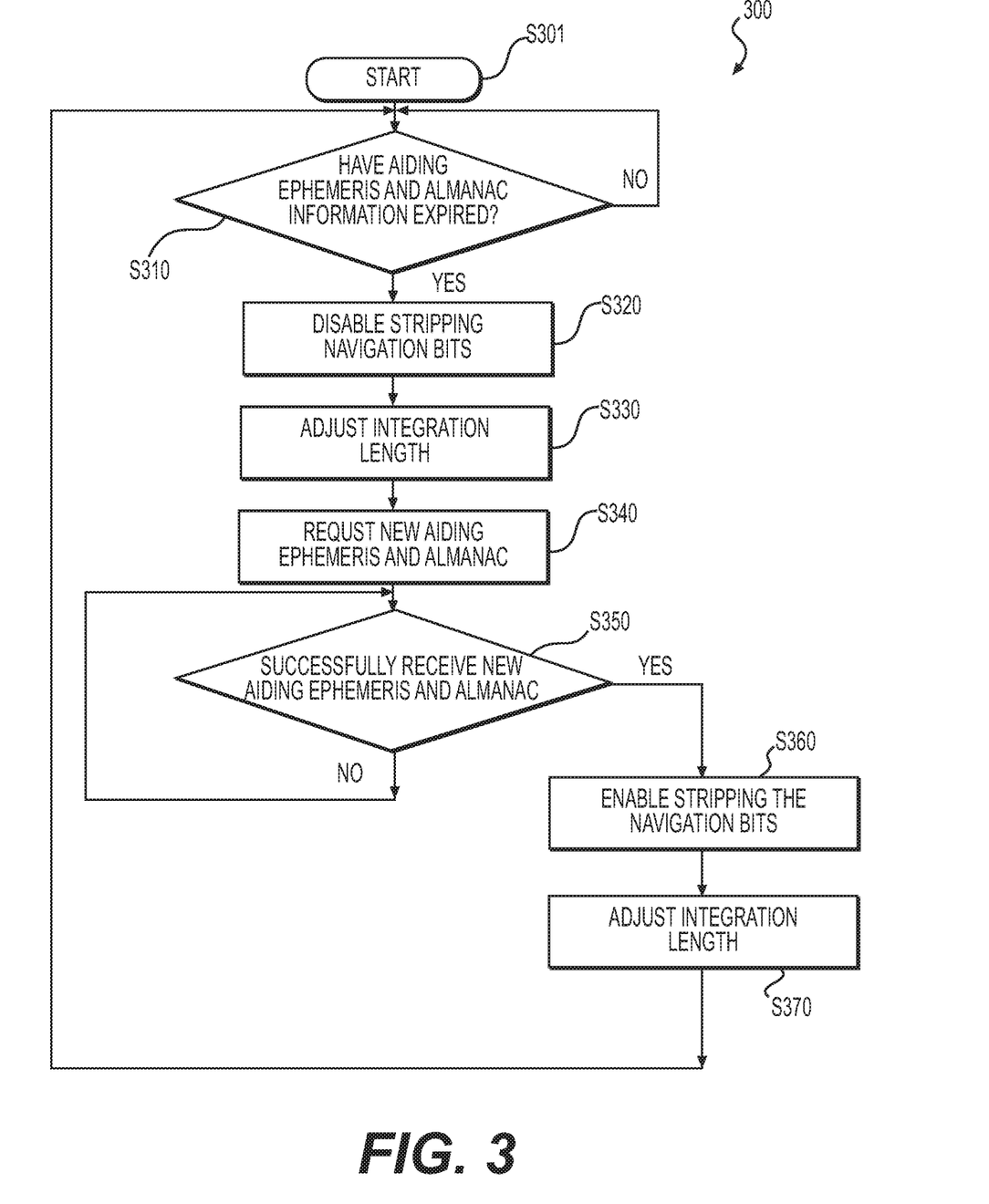
FIG. 3 shows a flow chart outlining a process 300 according to an embodiment of the disclosure.

FIG. 3 shows a flow chart outlining a process 300 according to an embodiment of the disclosure. In an example, the process 300 is executed by the update controller 180. The process starts at S301 and proceeds to S310.

At S310, the update controller 180 determines whether the aiding ephemeris and almanac have expired. The aiding ephemeris and almanac are provided by an aiding source other than the satellite signals, (e.g., from the server 103, the memory 150, the ephemeris and/or almanac prediction module 190, and the like). In an example, the satellites broadcast a new ephemeris every two hours. The ephemeris is generally valid for 4 hours. The update controller 180 determines whether the ephemeris and almanac in the satellite signals have been updated, and are different from the aiding ephemeris and almanac provided from for example the server 103. When the ephemeris and almanac in the satellite signals have been updated and are different from the aiding ephemeris and almanac from the server 103, the aiding ephemeris and almanac provided from the server 103 have expired. When the aiding ephemeris and almanac have expired, the process proceeds to S320; otherwise, the process returns to S310.

At S320, the update controller 180 disables the navigation bit strip module 170 and allows the correlation results to bypass the navigation bit strip module 170.

At S330, the update controller 180 adjusts the integration length. In an example, the update controller 180 provides control signals to the integration module 175 to adjust the integration length to be smaller than the navigation bit length.

At S340, the update controller 180 requests new aiding ephemeris and almanac (e.g., from the server 103). In an example, the update controller 180 controls the communication interface circuit 160 to send a request to the server 103.

At S350, the update controller 180 determines whether the electronic device 100 receives new aiding ephemeris and almanac from the server 103. When the new aiding ephemeris and almanac is successfully received, the process proceeds to S360; otherwise the process returns to S350 to wait for the new aiding ephemeris and almanac.

At S360, the update controller 180 controls the navigation bit construction module 185 to construct the aiding navigation bits based on the new aiding ephemeris and almanac and controls the navigation bit strip module 170 to strip navigation bits from the correlation results based on the aiding navigation bits.

At S370, the update controller 180 controls the integration module 175 to adjust the integration length. In an example, the update controller 180 controls the integration module 175 to use longer integration length, for example, longer than the navigation bit length, to determine, for example, the Doppler frequency with higher resolution. Then the process returns to S310.

It is noted that when the new aiding ephemeris and almanac are not available, the old aiding ephemeris and almanac can be used by the position engine 141. When the new aiding ephemeris and almanac are available, in an example, the update controller 180 updates the new aiding ephemeris and almanac for use in the position engine 141.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
  a receiving circuit configured to receive a satellite signal transmitted from a satellite, the satellite signal carrying navigation bits that are transmitted with a navigation bit length; and
  a processing circuit configured to:
    acquire aiding ephemeris and almanac information that are provided by an aiding source other than the satellite signal, the aiding ephemeris and almanac information in a format including a sign portion, an exponent portion, and a fraction portion,
    convert the aiding ephemeris and almanac information to raw binary bits as a product of the sign, exponent, and fraction portions of the format,
    construct aiding navigation bits based on the raw binary bits,
    determine that the aiding ephemeris and almanac information from the aiding source is unexpired, in response to the determination that the aiding ephemeris and almanac information from the aiding source is unexpired, strip the navigation bits from the satellite signal based on the aiding navigation bits to generate a post-stripping signal and perform an integration on the post-stripping signal with an integration length that is longer than the navigation bit length and an integer multiple of the navigation bit length, the stripping comprises for each navigation bit of the navigation bits associated with the satellite signal, identifying a navigation bit in the satellite signal based on the aiding navigation bits, and adjusting the satellite signal between a leading edge and trailing edge of the identified navigation bit to offset an influence caused by the identified navigation bit,
    determine that the aiding ephemeris and almanac information from the aiding source is expired;
    perform an integration on the satellite signal with the integration length that is smaller than the navigation bit length in response to the determination that the aiding ephemeris and almanac information is expired.

2. The apparatus of claim 1, wherein the processing circuit is configured to perform a coherent integration on the post-stripping signal.

3. The apparatus of claim 1, further comprising:
  a communication interface circuit configured to receive the aiding ephemeris and almanac information from an external source.

4. The apparatus of claim 1, further comprising:
  a memory circuit configured to store the aiding ephemeris and almanac information.

5. The apparatus of claim 1, wherein the processing circuit is configured to predict the aiding ephemeris and almanac information.

6. The apparatus of claim 1, further comprising:
  an update controller configured to determine whether the aiding ephemeris and almanac information have expired, and request an update of the aiding ephemeris and almanac information from the aiding source when the aiding ephemeris and almanac information have expired.

7. The apparatus of claim 6, wherein the update controller is configured to disable the processing circuit from stripping the navigation bits from the satellite signal when the aiding ephemeris and almanac information have expired.

8. The apparatus of claim 1, wherein the processing circuit is configured to measure Doppler frequency based on the integration.

9. A method for determining a position of a device, the method comprising:
  receiving, by the device, a satellite signal transmitted from a satellite, the satellite signal carrying navigation bits that are transmitted with a navigation bit length;
  acquiring aiding ephemeris and almanac information an aiding source other than the satellite signal, the aiding ephemeris and almanac information in a format including a sign portion, an exponent portion, and a fraction portion;
  converting the aiding ephemeris and almanac information to raw binary bits as a product of the sign, exponent, and fraction portions of the format;
  constructing aiding navigation bits based on the raw binary bits;
  determining that the aiding ephemeris and almanac information from the aiding source is unexpired;
  in response to the determination that the aiding ephemeris and almanac information from the aiding source is unexpired, stripping the navigation bits from the satellite signal based on the aiding navigation bits to generate a post-stripping signal; and
  performing an integration on the post-stripping signal with an integration length that is longer than the navigation bit length and an integer multiple of the navigation bit length, the stripping comprises for each navigation bit of the navigation bits associated with the satellite signal, identifying a navigation bit in the satellite signal based on the aiding navigation bits, and adjusting the satellite signal between a leading edge and trailing edge of the identified navigation bit to offset an influence caused by the identified navigation bit determine that the aiding ephemeris and almanac information from the aiding source is expired; and performing an integration on the satellite signal with the integration length that is smaller than the navigation bit length in response to the determination that the aiding ephemeris and almanac information is expired.

10. The method of claim 9, wherein performing the integration on the post-stripping signal further comprises:

performing a coherent integration on the post-stripping signal.

11. The method of claim 9, further comprising:

receiving, by a communication interface circuit, the aiding ephemeris and almanac information from an external source.

12. The method of claim 9, further comprising:

storing, in a memory of the device, the aiding ephemeris and almanac information.

13. The method of claim 9, further comprising: predicting the aiding ephemeris and almanac information.

14. The method of claim 9, further comprising:

determining whether the aiding ephemeris and almanac information have expired; and requesting an update of the aiding ephemeris and almanac information from the aiding source when the aiding ephemeris and almanac information expires.

15. The method of claim 14, further comprising:

disabling the stripping of the navigation bits from the satellite signal when the aiding ephemeris and almanac information have expired.

16. The method of claim 9, further comprising:

measuring Doppler frequency based on integration.

17. A non-transitory computer readable medium storing program instructions for causing a processor to execute operations for positioning, the operations comprising:

receiving, correlations between a satellite signal and an internal code, the satellite signal carrying navigation bits that are transmitted with a navigation bit length;

acquiring aiding ephemeris and almanac information that are provided by an aiding source other than the satellite signal, the aiding ephemeris and almanac information in a format including a sign portion, an exponent portion, and a fraction portion;

converting the aiding ephemeris and almanac information to raw binary bits as a product of the sign, exponent, and fraction portions of the format;

constructing aiding navigation bits based on the raw binary bits;

determining that the aiding ephemeris and almanac information from the aiding source is unexpired;

in response to the determination that the aiding ephemeris and almanac information from the aiding source is unexpired, stripping the navigation bits from the satellite signal based on the aiding navigation bits to generate a post-stripping signal; and performing an integration on the post-stripping signal with an integration length that is longer than the navigation bit length and an integer multiple of the navigation bit length, the stripping comprises for each navigation bit of the navigation bits associated with the satellite signal, identifying a navigation bit in the satellite signal based on the aiding navigation bits, and adjusting the satellite signal between a leading edge and trailing edge of the identified navigation bit to offset an influence caused by the identified navigation bit;

determining that the aiding ephemeris and almanac information from the aiding source is expired;

performing an integration on the satellite signal with the integration length that is smaller than the navigation bit length based on the determination that the aiding ephemeris and almanac information is expired.

18. The non-transitory computer readable medium of claim 17, wherein the operations further comprise:

determining whether the aiding ephemeris and almanac information have expired;

requesting an update of the aiding ephemeris and almanac information from the aiding source when the aiding ephemeris and almanac information have expired; and disabling the stripping of the navigation bits from the satellite signal when the aiding ephemeris and almanac information have expired.

* * * * *